Aug. 5, 1941.　　　　F. W. SHORT　　　　2,251,500
DISK HARROW
Filed Feb. 16, 1940　　　　2 Sheets-Sheet 1

Inventor
F. W. Short
by
Attorney

Aug. 5, 1941.     F. W. SHORT     2,251,500
DISK HARROW
Filed Feb. 16, 1940    2 Sheets-Sheet 2

Patented Aug. 5, 1941

2,251,500

UNITED STATES PATENT OFFICE 2,251,500

DISK HARROW

Floyd W. Short, Peoria, Ill., assignor to Allis-Chalmers Manufacturing Company, Milwaukee, Wis., a corporation of Delaware Application February 16, 1940, Serial No. 319,185

9 Claims. (Cl. 55—83)

The invention relates to disk harrows of the type having oppositely extending disk gangs, and it is concerned more specifically with an improved device for leveling the disk gangs.

When a disk harrow having oppositely extending disk gangs is operated in a field, the gangs are set at an angle to each other. The concave surface of the disks may face outwardly, in which case the inner ends of the gangs are trailing the outer ends, or inwardly, in which case the outer ends of the gangs are trailing. The action of the soil against the concave surfaces of the disks causes the trailing ends of the gangs to rise and the harrow to cut unevenly. This uneven cutting caused by the reaction of the soil against the disks affects the rear gangs of tandem disk harrows more than the forward gangs, because the rear gangs are operating on loose soil.

To overcome this uneven cutting, weight boxes and weights have been placed upon the gangs, but this method added considerable weight to the harrow and the increased weight increased the amount of power required to pull the harrow through the ground.

Attempts have also been made to overcome the disadvantages of the weight boxes by installing a spring mechanism which operates to counteract the forces of the soil and cause the harrow to cut evenly.

It is an object of the invention to provide an improved mechanism for depressing the trailing ends of the gangs, that is, the ends which are faced by the convex sides of the disks, and which ends tend to rise due to the action of the soil upon the concave sides of the disks.

Another object of the invention is to provide an improved leveling mechanism of the mentioned character which is easily applicable to any type of disk harrow having oppositely extending gangs.

A further object of the invention is to provide an improved leveling mechanism of the mentioned character which can be easily adjusted to permit the harrow to operate under different soil conditions.

A still further object of the invention is to provide a leveling mechanism for a harrow which is simple and compact in construction, efficient in operation, and which can be manufactured at low cost.

Other objects and advantages of the invention will be apparent from the following description and accompanying drawings, in which like numerals designate like parts in the various views.

Figure 1:
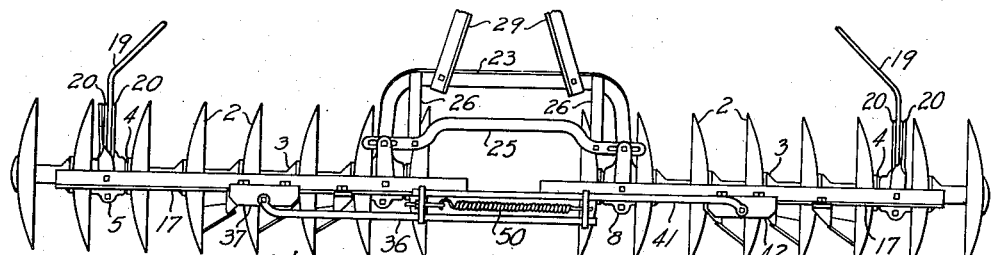
Fig. 1 is a top view of a portion of a harrow equipped with a leveling mechanism embodying the invention and showing the rear gangs in transport position.
Figure 2:
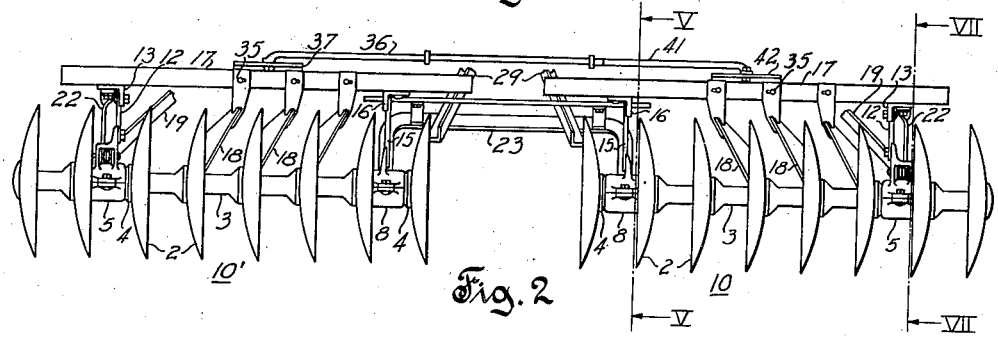
Fig. 2 is a rear view of the harrow shown in Fig. 1.

Figs. 1 and 2 show the general arrangement of the rear gangs of a tandem disk harrow equipped with a leveling mechanism embodying the invention. The rear gangs in Figs. 1 and 2 are shown in transport position and it is in this position, in which the gangs are axially alined, that the harrow is transported to and from the field. In this position the gangs do not cut in the ground but only ride over it.

The rear gangs illustrated in Figs. 1 and 2 are composed of two gangs 10 and 10' arranged in oppositely extending relation. The gangs are composed of similar parts, but are arranged in right and left hand relation to each other. To avoid undue duplication of description, only one gang will be herein described, it being understood that the same will apply to the other gang having similar parts.

Referring to gang 10, the numeral 1 designates a square axle on which are mounted dished disks 2 and spacers 3, the concave sides of the disks facing the inner end of the gang, and the outer end of the gang being faced by the convex sides of the disks. Near each end of axle 1 are mounted bearing spacers 4 which serve as spacers for the disks 2 and also as bearing surfaces. Outer bearing housing 5 which is equipped with grease fittings 6 holds wooden blocks 7 which have bearing surfaces contacting the bearing spacer 4 near the outer end of axle 1. Inner bearing housing 8 which is equipped with grease fittings 6 also contains wood bearing blocks 7 which contact bearing spacer 4 of the bearing at the inner end of shaft 1.

Outer bearing housing 5 is provided with an upstanding arm 11 to which is secured a vertical post 12. An angle bracket casting 13 is provided with a downwardly extending channeled portion and is bolted to the vertical post 12.

Inner bearing housing 8 is provided with an upstanding arm 14 to which is secured a vertical post 15. Bracket 16, having a downwardly extending channeled portion and a forwardly extending arm, is bolted to the upper portion of vertical bar 15.

Scraper bar 17 is bolted to brackets 13 and 16 and forms a support for scrapers 18 and for the leveling mechanism presently to be described.

Outer diagonal draft bar 19 for each gang is fitted with replaceable straps 20 at the rear end thereof. Straps 20 are inserted in a hole in outer bearing housing 5 and are held loosely in place by a pin 21. A brace bar 22 on each gang is connected between diagonal draft bar 19 and angle bracket 13 to hold the vertical bar 12 of each gang in its upstanding position. Diagonal draft bars 19 are connected to the forward gangs (not shown) and supply draft to the outer ends of the gangs.

A U-shaped bar 23 is loosely connected to the two inner bearing housings 8 by bolts 24. A strap 25 is connected to the U-shaped bar 23 by braces 26 and has slots 27 near its ends for the reception of bolts 28 which connect the strap 25 with the forwardly extending arms of brackets 16. Slots 27 permit the gangs to have relative tilting movement in a transverse vertical plane.

Central draft bars 29 of angle iron are secured to U-shaped bar 23 and extend forwardly to a sliding connection with the front gangs (not shown).

Angling of the rear gangs is accomplished by forward movement of the angle bars 29 relative to the outer diagonal draft bars 19. This movement of the bars 29 may be accomplished in any suitable manner, for instance by means of a mechanism such as shown and described in U. S. Patent No. 1,223,145, April 17, 1917, W. W. Cameron, Double-disk harrow.

Figure 3:
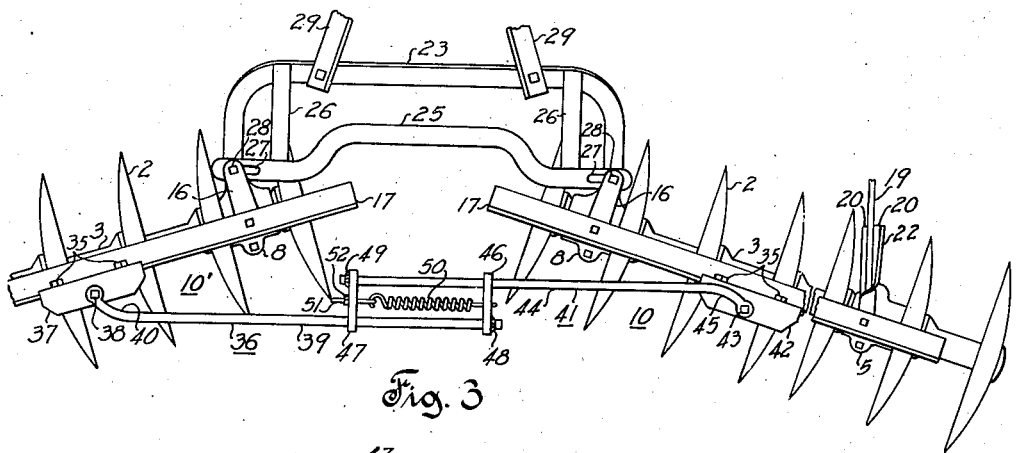
Fig. 3 is an enlarged top view showing the leveling mechanism and a portion of the rear gang of the harrow in working position.

When the gangs are angled as indicated in Fig. 3, and the harrow is pulled forwardly, the action of the soil against the concave surfaces of the gangs tends to cause the trailing ends of the gangs to rise and the harrow to cut unevenly. Such tendency of the harrow to cut unevenly is counteracted by a spring actuated gang leveling mechanism which functions to depress the trailing ends of the gangs, that is, the ends which are faced by the convex sides of the disks, and which mechanism is constructed as follows:

A solid iron rod 36, preferably of a round cross-section, has an eye formed at one end which is pivotally connected to an angular bracket 37 by a bolt 38. Rod 36 has a long straight portion 39 and a bent portion 40 to offset the connection of the rod 36 to the bracket 37. Bracket 37 is cut from an angle bar and is mounted on the scraper bar 17 of the gang 10′ intermediate the ends of gang 10′ approximately in the middle between the connections of the posts 12 and 15 with the scraper bar 17. The bracket 37 is secured to the scraper bar 17 by a pair of bolts 35 which also serve to retain the two adjacent scrapers 18 in place on the bar 17. As explained hereinbefore post 12 is connected to the axle 1 and to the diagonal draft bar 19 by bearing housing 5, and post 15 is connected to the axis 1 and to the inner U-shaped draft bar 23 by bearing housing 8. The bracket 37 is therefore connected to the gang 10′ not only intermediate the ends of said gang but also intermediate the points of draft application to said gang. A solid iron rod 41 is identical in shape to rod 36, that is, the rod 41 has an eye corresponding to the eye of rod 36 and a long straight portion 44 and a bent portion 45. The eye of the rod 41 is pivotally connected to an angular bracket 42 which is a duplicate of bracket 37 by a bolt 43. Bracket 42 is secured to the scraper bar 17 of gang 10 by bolts 35 in a position corresponding to the position of bracket 37 on gang 10′; that is, the bracket 42 is positioned intermediate the ends of gang 10 approximately in the middle between the points of draft application to said gang. The bolts 35 which retain the bracket 42 of gang 10 in place on the scraper bar 17 also serve to hold two scrapers 18 adjacent to the bracket 42 in place. The portion 44 of the rod 41, as shown in Figs. 1 and 3, is positioned in advance of a transverse line passing through bolts 38 and 43, and the portion 39 of rod 36 is positioned in the rear of said transverse line, the spaced relation of the rods to said line being obtained by the offsetting of the eyes of the rods. The spacing of the rod portions 39 and 44 permits overlapping of said rod portions parallel to each other and provides a space for coil spring 50 which resists relative approach of the bolts 38 and 43 as will presently appear.

A guide arm 46 and a guide arm 47, as best shown in Fig. 3, are made of flat bar iron and have round holes near each end to permit the reception of the rods 36 and 41. Guide arm 46 after being placed on rods 36 and 41 is welded or otherwise secured at 48 to the end of rod 36. Guide arm 47 after being placed over rods 36 and 41 is welded or otherwise secured at 49 to the end of rod 41. It will be noted that guide arm 46 is free to slide on rod 41 and that guide arm 47 is free to slide on rod 36, and that the two rods 36 and 41 are thus connected for telescopic movement relative to each other.

The coil spring 50 is adjustably connected to guide arm 47 by an eye bolt 51 which passes through guide arm 47 and carries a nut 52. The other end of spring 50 is hooked into an opening in guide arm 46. In the position of the mechanism shown in Fig. 3 the coil spring 50 is initially tensioned and tends to lengthen the distance between the outer ends of the rods 36 and 41, or in other words, the spring 50 resists shortening of the distance between the outer ends of the rods 36 and 41.

The described gang leveling mechanism, due to the action of the spring 50, functions to counteract the tendency of the trailing ends of the gangs to rise, which tendency as mentioned hereinbefore, results from the reaction of the soil upon the disks. Depending upon the condition of the soil as to moisture content and hardness, the spring 50 is tensioned more or less by adjustment of the nut 52 so as to cause the harrow to cut evenly. The tension of the spring is greater when the harrow is to be operated in soil which is soft or loose than when the ground is hard and packed. That is, the greater the depth of penetration of the disks the greater is the initial tension required in spring 50 in order to counteract the tendency of the trailing ends of the gangs to rise. The depth of cut for a particular soil is dependent upon the angularity of the gangs, and the initial tension of spring 50 is so adjusted as to correspond to the particular angular adjustment of the gangs.

Figure 4:
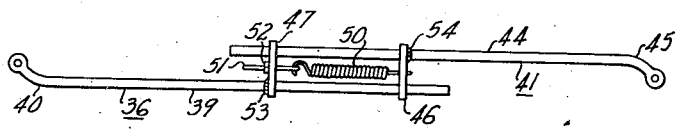
Fig. 4 is a modification of the leveling mechanism shown in Figs. 1 to 5.
Figure 6:
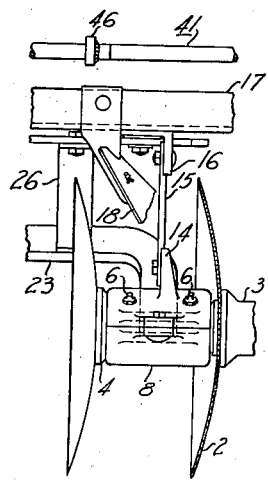
Fig. 6 is a rear view of the parts shown in Fig. 5.
Figure 5:
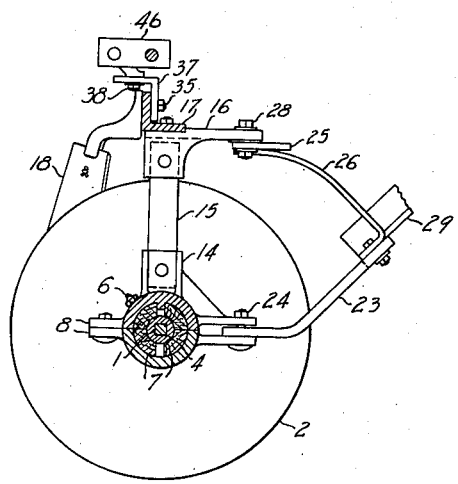
Fig. 5 is an enlarged sectional view taken on line V—V of Fig. 2.
Figure 8:
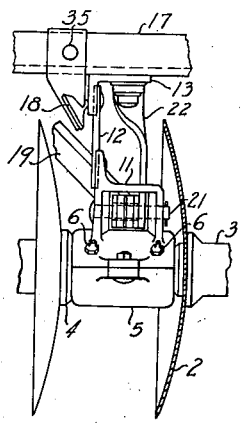
Fig. 8 is a rear view of the parts shown in Fig. 7.
Figure 7:
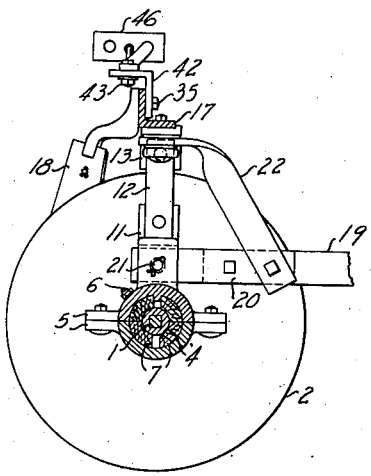
Fig. 7 is an enlarged sectional view taken on line VII—VII of Fig. 2.

If the concave surfaces of the disks face outwardly, as is usually the case in single action disk harrows and in the forward gangs of tandem disk harrows, the leveling mechanism is assembled as shown in Fig. 4. As shown in Fig. 4, guide arms 47 and 46 are welded to intermediate portions of the rods 36 and 41 at points 53 and 54, respectively, so that the action of the spring 50 tends to shorten the distance between the outer ends of the rods 36 and 41, as distinguished from the arrangement shown in Fig. 3 where the tension of spring 50 tends to lengthen the distance between the outer ends of the rods 36 and 41. The leveling mechanism shown in Fig. 4 is connected to the harrow in the same manner as described in connection with Fig. 3, but since the action of the spring tends to bring the connecting brackets 37 and 42 together, the inner ends of the gangs are forced down to counteract the up thrust of the inner ends of the gangs when operating the harrow.

It should be understood that it is not intended to limit the invention to the exact details of construction herein shown and described, for various modifications within the scope of the claims may occur to persons skilled in the art.

It is claimed and desired to secure by Letters Patent:

1. In a disk harrow, the combination of two oppositely extending disk gangs, draft means for said gangs, a bracket secured to each of said gangs above the axis thereof, a pair of transversely extending rods pivotally supported, respectively, on said brackets, guide means associated with relatively adjacent portions of said rods for controlling relative longitudinal movement of said rods, and spring means cooperating with said rods to resist said relative longitudinal movement thereof.

2. A gang leveling device for disk harrows comprising two rod members slidably associated with each other, a spring cooperating with said members to resist relative sliding movement thereof, and means for adjusting the resistance exerted by said spring.

3. A gang leveling device for disk harrows comprising two rod members having relatively adjacent inner ends slidably connected together for endwise movement relative to each other, and a spring operatively connected with said rod members to resist shortening of the distance between the outer ends of said rod members.

4. A gang leveling device for disk harrows comprising two identically formed rod members connected together for endwise movement relative to each other, and a spring adjustably connected with said rod members to resist relative sliding movement thereof in one direction.

5. In a disk harrow, a draft structure, a pair of disk supports connected with said draft structure for horizontal angular movement relative to each other, two series of dished cutting disks mounted, respectively, on said disk supports, the disks of one series being reversed relative to the disks of the other series, and mechanism for depressing the ends of said disk supports faced by the convex sides of said disks, said mechanism comprising a pair of vertically rigid elements supportingly connected, respectively, with said disk supports for horizontal angular movement relative thereto, and means independent of said disk supports and independent of said draft structure supportingly connecting said elements with each other for relative movement transversely of the direction of propulsion of the harrow.

6. In a disk harrow, a draft structure, a pair of disk supports connected with said draft structure for horizontal angular movement relative to each other, two series of dished cutting disks mounted, respectively, on said disk supports, the disks of one series being reversed relative to the disks of the other series, and mechanism for depressing the ends of said disk supports faced by the convex sides of said disks, said mechanism comprising a pair of vertically rigid elements supportingly connected, respectively, with said disk supports for horizontal angular movement relative thereto, and means independent of said disk supports and independent of said draft structure, including a resilient connection between said elements, whereby said elements are supportingly connected with each other, for resilient relative movement transversely of the direction of propulsion of the harrow.

7. In a disk harrow, a draft structure, a pair of disk supports connected with said draft structure for horizontal angular movement relative to each other, two series of dished cutting disks mounted, respectively, on said disk supports, the disks of one series being reversed relative to the disks of the other series, and mechanism for depressing the ends of said disk supports faced by the convex sides of said disks, said mechanism comprising a pair of rod members supportingly connected, respectively, with said disk supports for horizontal angular movement relative thereto, means supportingly connecting one of said rod members with the other for endwise movement of said rod members relative to each other, and resilient means operatively connected with said rod members for controlling said endwise movement thereof.

8. In a disk harrow, a draft structure, a pair of disk supports connected with said draft structure for horizontal angular movement relative to each other, two series of dished cutting disks mounted, respectively, on said disk supports, the disks of one series being reversed relative to the disks of the other series, and mechanism for depressing the ends of said disk supports faced by the convex sides of said disks, said mechanism comprising a first rod member supportingly connected at one end with one of said disk supports for horizontal angular movement relative thereto, a second rod member supportingly connected at one end with the other of said disk supports for horizontal angular movement relative thereto, a first arm secured to said first rod member at the other end thereof and engaging an intermediate portion of said second rod member for axial sliding movement thereon, a second arm secured to said second rod member at the other end thereof and engaging an intermediate portion of said first rod member for axial sliding movement thereon, and a tension spring connected at opposite ends to said arms.

9. In a disk harrow, a draft structure, a pair of disk supports connected with said draft structure for horizontal angular movement relative to each other, two series of dished cutting disks mounted, respectively, on said disk supports, the disks of one series being reversed relative to the disks of the other series, and mechanism for depressing the ends of said disk supports faced by the convex sides of said disks, said mechanism comprising a first rod member supportingly connected at one end with one of said disk supports for horizontal angular movement relative thereto, a second rod member supportingly connected at one end with the other of said disk supports for horizontal angular movement relative thereto, a first arm secured to an intermediate portion of said first rod member and engaging a portion of said second rod member at the other end thereof for axial sliding movement thereon, a second arm secured to an intermediate portion of said second rod member and engaging a portion of said first rod member at the other end thereof for axial sliding movement thereon, and a tension spring connected at opposite ends to said arms.

FLOYD W. SHORT.